Patented Dec. 19, 1950

2,534,278

UNITED STATES PATENT OFFICE 2,534,278

CRYSTALLIZATION POINT DEPRESSANTS FOR PETROLEUM HYDROCARBON SOLUTIONS OF PARADICHLORDIPHENYL TRICHLOROETHANE

Leo Liberthson, New York, N. Y., and Jacob Faust, Belleville, N. J., assignors to L. Sonneborn Sons, Inc., a corporation of Delaware No Drawing. Application February 19, 1946, Serial No. 648,822

9 Claims. (Cl. 167—30)

This invention relates to new and useful improvements in crystallization point depressants for petroleum hydrocarbon solutions of paradichlordiphenyl trichlorethane.

Petroleum hydrocarbons, particularly those of a Saybolt viscosity (at 100° F.) of between 30 and 50 seconds, are commonly used either as such or as carriers for specific insecticidal agents in the control of a variety of insects. These petroleum hydrocarbons or the insecticide-petroleum hydrocarbon solutions are mostly used in the form of their aqueous emulsions. Though a variety of other solvents have been from time to time proposed and used, the petroleum hydrocarbons are preferred inter alia by reason of their relative chemical and physical inertness and their relative low evaporation rate. A further advantage for the insecticidal use of petroleum hydrocarbons lies in their superior capacity to form very finely divided and dispersed droplets, giving rise to nebulae that will hover over and around the area sprayed for a considerable period of time, thus producing conditions most favorable for insecticidal control.

One of the most effective insecticides is paradichlordiphenyl trichlorethane. This agent, however, though soluble in petroleum hydrocarbons of the aforementioned viscosity range, is in its petroleum hydrocarbon solutions subject to crystallization or precipitation upon temperature drop.

The minimum effective concentration for residual film formation of paradichlordiphenyl trichlorethane is normally considered to be about 5%. By residual film formation is meant the characteristic of remaining deposited in a fine film on the object sprayed after the evaporation or other removal, such as by weathering, of the carrier.

Petroleum hydrocarbon solutions of paradichlordiphenyl trichlorethane however are stable, i. e., substantially non-crystallizing in effective concentrations only at temperatures above the lower temperatures that may be encountered in year-round spraying operations or in the year-round storage of such solutions. Thus, petroleum hydrocarbon solutions of 5% and in excess of 5% of paradichlordiphenyl trichlorethane, are stable only at temperatures of 85° and higher. Higher concentrations demand proportionately higher temperatures for stability. If the temperature drops below the point of stability for a given concentration, crystallization or precipitation of the insecticide takes place. Even though thereafter the temperature will reach or even go slightly above the critical point at which crystallization took place, redissolution will not be readily effected. It is then usually necessary to heat the solution to temperatures considerably higher than the critical temperatures of crystallization for the given concentrations.

One object of our invention embraces, inter alia, a crystallization depressant for petroleum hydrocarbon solutions of paradichlordiphenyl trichlorethane.

Another object of our invention embraces an insecticidal composition comprising a petroleum hydrocarbon solution of paradichlordiphenyl trichlorethane having a crystallization point lower than that normally inherent in such solution.

By crystallization point as used herein is meant that temperature point at which, at a temperature drop, the paradichlordiphenyl trichlorethane begins to crystallize or precipitate out of its solution.

The foregoing and further objects of the invention will be understood from the following description:

The crystallization depressant in accordance with the invention comprises a substantially oil-soluble petroleum sulfonate selected from the group consisting of alkali and alkaline earth metal petroleum sulfonates containing occluded oil, and small quantities of a phthalic acid aliphatic alcohol ester.

The substantially oil-soluble petroleum sulfonates used in accordance with the invention are preferably petroleum mahogany sulfonates as they are conventionally obtained in the fuming sulfuric acid refining of petroleum oil distillates and containing varying amounts of occluded oil. The expression "occluded oil" as used herein in connection with oil-soluble petroleum sulfonates is to designate, as is conventionally understood in the art, that portion of oil, i. e., petroleum hydrocarbon, which is relatively tenaciously retained or occluded by the oil-soluble petroleum sulfonates when separated from the oil layer containing the same and resulting from the acid refining referred to. Depending upon varying conditions of sulfuric acid distillate refining, the occluded oil content of the oil-soluble petroleum sulfonates may range from 30 to 50%. For best results, however, we prefer to use an oil-soluble petroleum sulfonate having an occluded oil content of from 30 to 40%.

The aliphatic phthalate used as a component of the novel crystallization depressant in accordance with the invention is preferably present in amounts of from 15 to 30% and for best results we find it of advantage to use from 20 to 25% of such phthalate calculated on the amount of petroleum sulfonates present (based on dry weight). Within the broad scope of our invention however the percentage of phthalate to sulfonate in the depressant should be not less than 5% by weight of the sulfonate. Whereas, the amounts herein specified for best results, using appropriate amounts of depressant, produce crystallization point depression to below zero (0° F.), lesser percentage ratios of phthalate to sulfonate down to the minimum percentage herein specified, will produce crystallization point depressions of a lesser calibre, say down to about 25° F., which suffices for many purposes and particularly in milder climates. Preferred phthalates in accordance with the invention are dialkyl phthalates including substituted dialkyl phthalates such as dialkyl ether phthalates; particularly good results are obtained with dimethyl phthalate and diethylene glycol monoalkyl ether phthalate.

The insecticidal composition within the scope of our invention essentially comprises a petroleum hydrocarbon solution of paradichlordiphenyl trichlorethane having normally a relatively high crystallization point due to the paradichlordiphenyl trichlorethane dissolved therein and containing small quantities of a crystallization point depressant composed of at least one member selected from the group consisting of substantially oil-soluble alkali and alkaline earth metal petroleum sulfonates containing occluded oil and small amounts of alkyl phthalate, the crystallization point depressant being in amount and potency sufficient to appreciably lower such crystallization point and preferably by at least 10° F., and said phthalate being present up to its solubility limit in said petroleum hydrocarbon.

For satisfactory results we find it in many cases of advantage to prepare a solution of paradichlordiphenyl trichlorethane in a suitable hydrocarbon containing an amount of crystallization point depressant at least 50%, and preferably at least 70%, of the amount by weight of paradichlordiphenyl trichlorethane in solution. All amounts of crystallization point depressant and all amounts of component ingredients specified in accordance with the invention are calculated on a dry weight basis, with all amounts of the oil-soluble petroleum sulfonates calculated on the basis of dry sulfonates, i. e., without occluded oil.

The preferred method of preparing the insecticidal composition in accordance with the invention is to first dissolve the sulfonate and phthalate in the hydrocarbon and to thereafter add the paradichlordiphenyl trichlorethane. Alternatively, however, the crystallization point depressant in accordance with the invention, either as such, or by way of its individual components may be added to a previously prepared hydrocarbon solution of paradichlordiphenyl trichlorethane.

The petroleum hydrocarbon or hydrocarbon solvent useful for the insecticidal composition in accordance with the invention may be any suitable petroleum hydrocarbon or petroleum hydrocarbon cut of the type for instance conventionally used either as such or by way of carrier for insecticidal purposes. A suitable petroleum hydrocarbon distillate is for instance one of a Saybolt viscosity (at 100° F.) of between 30 and 50 seconds and constitutes a particularly satisfactory carrier agent for the insecticidal composition in accordance with the invention.

The crystallization point depressant in accordance with the invention may be prepared by compounding the phthalate with a suitable (occluded oil-containing) oil-soluble petroleum sulfonate. For the purpose of facilitating compounding, it is often of advantage to slightly heat the sulfonate in order to impart thereto a greater fluidity.

The following examples are furnished by way of illustration but not of limitation:

*Example I*

(A) 100 parts by weight of sodium petroleum mahogany sulfonate containing 35 parts by weight of retained oil were warmed to about 150° F. and then blended with 15 parts by weight of dimethyl phthalate.

(B) 100 parts by weight of barium petroleum mahogany sulfonate containing 35 parts by weight of retained oil were warmed to about 150° F. and then blended with 15 parts by weight of dimethyl phthalate.

*Example II*

Five parts by weight of paradichlordiphenyl trichlorethane were dissolved at 80° F. in 95 parts by weight of 30 viscosity (Saybolt at 100° F.) petroleum distillate. This solution was then placed in an A. S. T. M. cold-test cabinet. The solution was observed at every temperature drop of 10° and the point at which crystallization took place was observed. Crystallization first appeared at 72° F. and was progressive until at 20° F. substantially the entire quantity of the paradichlordiphenyl trichlorethane had crystallized out. The crystallized solution was removed from the cold cabinet and the supernatant solvent decanted. Determination of the amount remaining in solution showed only 1.2% of paradichlordiphenyl trichlorethane. Thus, 75% of the originally dissolved compound had crystallized out at 20° F.

When the crystallized mass was allowed to revert to room temperature, re-solution did not take place to any appreciable extent. It was necessary to heat the solution to a temperature of about 95–100° F. before complete re-solution was effected.

*Example III*

5.75 parts by weight of the crystallization depressant as made in accordance with Example I-A were dissolved in 94.25 parts by weight of a 30 viscosity (Saybolt at 100° F.) petroleum distillate. 5 parts by weight of paradichlordiphenyl trichlorethane were dissolved in 95 parts by weight of the solution so prepared. The solution was prepared at 80° F. and was then placed in an A. S. T. M. cold-test cabinet, being thereafter examined at every 10° drop in temperature. No crystallization was observed down to minus 10° F.

*Example IV*

5.75 parts by weight of the crystallization depressant as made in accordance with Example I-B were dissolved in 94.25 parts by weight of a 30 viscosity (Saybolt at 100° F.) petroleum distillate. 5 parts by weight of paradichlordiphenyl trichlorethane were dissolved in 95 parts by weight of the solution so prepared. The solution was prepared at 80° F. and was then placed in an A. S. T. M. cold-test cabinet, being thereafter examined at every 10° drop in temperature. No crystallization was observed down to minus 10° F.

The following table exemplifies the crystallization points obtained with depressants compounded in accordance with Example III and prepared in accordance with Example I-A, using in each instance the particular phthalate and particular percentage proportion by weight of sulfonate specified in the table; the crystallization points as set forth in the table were determined in accordance with the A. S. T. M. procedure set forth in Example II:

Table

| Phthalate | Phthalate to Sulfonate (dry weight) in depressant | Crystallization point (A.S.T.M.) |
|---|---|---|
| | Percent | ° F. |
| Dimethyl Phthalate | 5 | +20 |
| Do | 15 | 0/−5 |
| Do | 25 | −10 |
| Do | 33.33 | −10 |
| Diethyl Phthalate | 25 | +20 |
| Dibutyl Phthalate | 25 | +25 |
| Diamyl Phthalate | 25 | +10/+5 |
| Dioctyl Phthalate | 25 | +5 |
| Diethylene glycol mono ethyl ether phthalate | 25 | −10 |
| Do | 33.33 | −10 |

The foregoing description is for purposes of illustration and not of limitation and it is therefore our intention that the invention be limited only by the appended claims or their equivalents wherein we have endeavored to claim broadly all inherent novelty.

We claim:

1. A crystallization point depressant for petroleum hydrocarbon solutions of paradichlordiphenyl trichlorethane having normally a relatively high crystallization point due to the paradichlordiphenyl trichlorethane dissolved therein, predominantly comprising at least one substantially oil-soluble petroleum sulfonate containing occluded oil and selected from the group consisting of alkali and alkaline earth metal petroleum sulfonates, and at least 5% by dry weight of said sulfonate, of a phthalic acid aliphatic alcohol ester.

2. A crystallization point depressant in accordance with claim 1 in which said ester is present in amount from 15 to 30% by dry weight of said sulfonate.

3. A crystallization point depressant for petroleum hydrocarbon solutions of paradichlordiphenyl trichlorethane having normally a relatively high crystallization point due to the paradichlordiphenyl trichlorethane dissolved therein, which predominantly comprises at least one substantially oil-soluble petroleum sulfonate containing occluded oil and selected from the group consisting of alkali and alkaline earth metal petroleum sulfonates, and at least 5%, by dry weight of said sulfonate, of a dialkyl phthalate.

4. A crystallization point depressant in accordance with claim 3 in which said dialkyl phthalate is dimethyl phthalate present in amount from 15 to 30% by dry weight of said sulfonate.

5. A crystallization point depressant in accordance with claim 3 in which said dialkyl phthalate is diethylene glycol mono alkyl ether phthalate present in amount from 15 to 30% by dry weight of said sulfonate.

6. An insecticidal composition which comprises a petroleum hydrocarbon solution of paradichlordiphenyl trichlorethane having normally a relatively high crystallization point due to the paradichlordiphenyl trichlorethane dissolved therein, at least one member selected from the group consisting of substantially oil-soluble alkali and alkaline earth metal petroleum sulfonates containing occluded oil, and at least 5% by dry weight of said sulfonate of a phthalic acid aliphatic alcohol ester, said sulfonate and said ester being present in the aggregate to at least 50% by weight of the paradichlordiphenyl trichlorethane in solution, said ester being present in amount up to its solubility limit in said petroleum hydrocarbon.

7. An insecticidal composition in accordance with claim 6 in which said ester is a dialkyl phthalate, is present from 15 to 30% by dry weight of said sulfonate and in which said ester and said sulfonate are present in the aggregate to at least 50% by weight of said paradichlordiphenyl trichlorethane in solution.

8. An insecticidal composition in accordance with claim 6 in which said ester is dimethyl phthalate present from 15 to 30% by dry weight of said sulfonate and in which said ester and said sulfonate are present in the aggregate to at least 50% by weight of said paradichlordiphenyl trichlorethane in solution.

9. An insecticidal composition in accordance with claim 6 in which said ester is diethylene glycol mono ethyl ether phthalate present from 15 to 30% by dry weight of said sulfonate and in which said ester and said sulfonate are present in the aggregate to at least 50% by weight of said paradichlordiphenyl trichlorethane in solution.

LEO LIBERTHSON.
JACOB FAUST.

REFERENCES CITED

The following references are of record in the file of this patent:

UNITED STATES PATENTS

| Number | Name | Date |
|---|---|---|
| Re. 22,700 | Muller | Dec. 4, 1945 |
| 1,679,919 | Rogers et al. | Aug. 7, 1928 |
| 2,068,089 | Steik et al. | Jan. 19, 1937 |
| 2,356,801 | Travis et al. | Aug. 29, 1944 |
| 2,364,582 | Davis et al. | Dec. 5, 1944 |
| 2,412,720 | Dolman | Dec. 17, 1946 |
| 2,420,928 | Bosquet et al | May 20, 1947 |
| 2,448,665 | Fleck et al. | Sept. 7, 1948 |

FOREIGN PATENTS

| Number | Country | Date |
|---|---|---|
| 547,871 | Great Britain | Sept. 15, 1942 |

OTHER REFERENCES

Kearns et al.: Ann. Report of Agri. & Horti. Research Station, Long Ashton, Bristol, 1934, page 110. Copy in 167-42.

Jour. Econ. Ent., Feb. 1944, pages 132, 133 by Lindquist et al.

Wells: Jour. Eco. Entom. 37, No. 1 (Feb. 1944) pages 136, 137.

Soap & Sanitary Chemicals No. 1945, page 1110, by Jones et al.

Hackh's Chem. Dict., 3rd ed., 1944, pages 635, 636, "Petroleum."

Jones et al.: Soap and San. Chem., Nov. 1945, page 110.

Fleck et al.: I. & E. Chem., Feb. 1946, 38, No. 2.